United States Patent
Nokes

[15] 3,650,097
[45] Mar. 21, 1972

[54] PROGRAMMED STEERING MEANS FOR MOWING APPARATUS OR THE LIKE

[72] Inventor: Clarence D. Nokes, Washington, D.C.
[73] Assignee: Warren K. Van Hook, Washington, D.C. a part interest
[22] Filed: Mar. 12, 1970
[21] Appl. No.: 18,009

Related U.S. Application Data

[63] Continuation of Ser. No. 650,045, June 29, 1967, abandoned.

[52] U.S. Cl. ................56/10.2, 46/244 D, 56/11.9, 56/DIG. 15, 180/79.1
[51] Int. Cl. .................................................A01d 35/24
[58] Field of Search ...............56/10.1, 10.2, 11.9, 14.7, 56/DIG. 3, DIG. 15; 46/244 D; 180/79–79.5

[56] References Cited

UNITED STATES PATENTS

| | | | |
|---|---|---|---|
| 3,061,035 | 10/1962 | King | 180/79.1 |
| 3,077,066 | 2/1963 | Nokes | 56/10.2 |
| 3,131,508 | 5/1964 | Brown | 46/244 D |
| 3,252,247 | 5/1966 | Miller et al. | 180/79.1 X |

Primary Examiner—Louis G. Mancene
Assistant Examiner—J. A. Oliff
Attorney—Imirie & Smiley

[57] ABSTRACT

Self-contained apparatus in the nature of a lawn mower for movement over a given land area in a pre-planned route, the apparatus having a frame and a steering mechanism with a tape extending between two reels with intermediate elements contacted sequentially by the tape and operating when contacted to turn the machine.

11 Claims, 11 Drawing Figures

PATENTED MAR 21 1972

INVENTOR
CLARENCE D. NOKES

BY *[signature]*
ATTORNEY

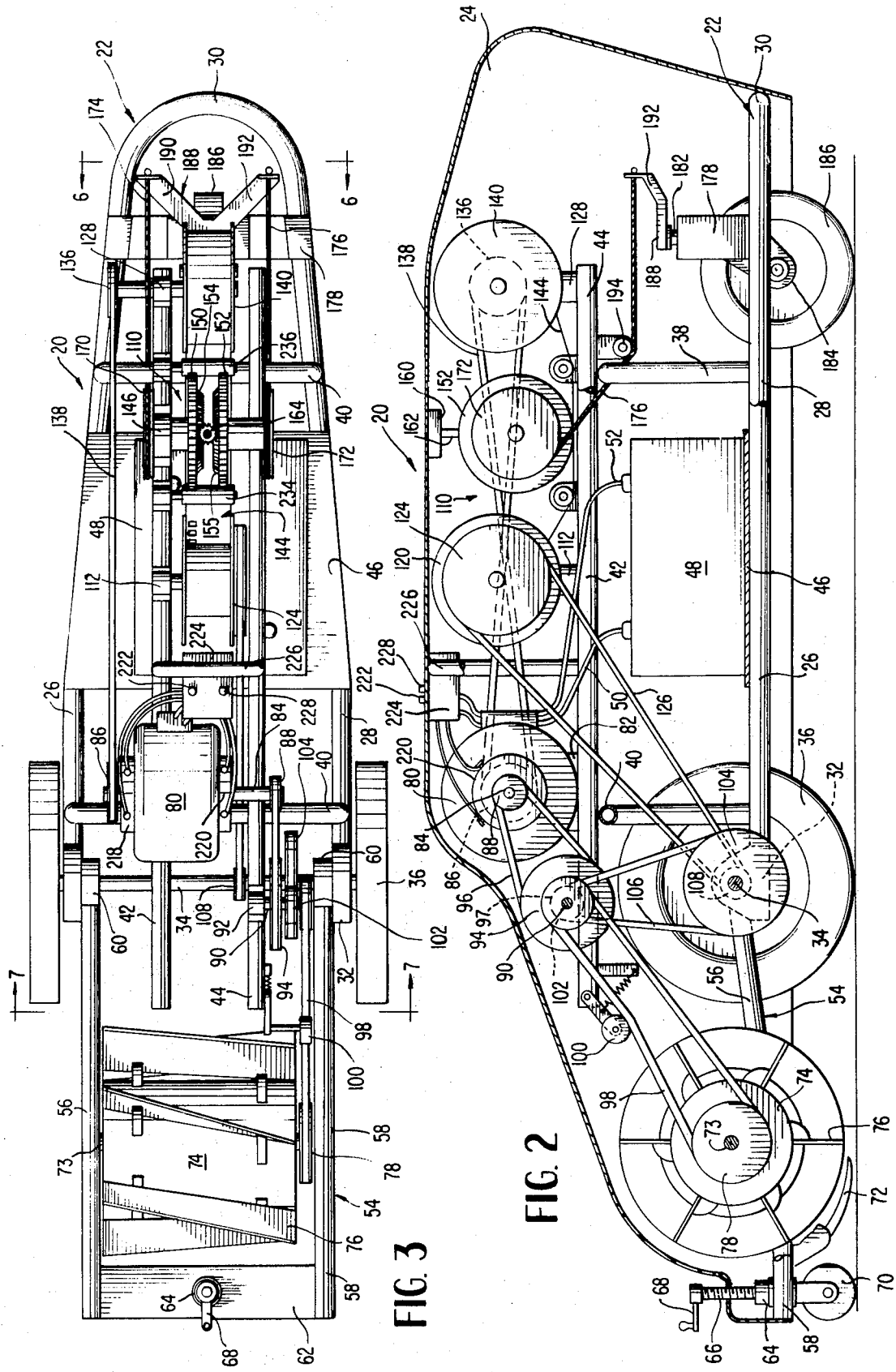

PATENTED MAR 21 1972 3,650,097

INVENTOR
CLARENCE D. NOKES

BY *Murie M. Smiley*

ATTORNEY

PATENTED MAR 21 1972

INVENTOR
CLARENCE D. NOKES
By

PROGRAMMED STEERING MEANS FOR MOWING APPARATUS OR THE LIKE

This application is a continuation of application Ser. No. 650,045, filed June 29, 1967, and now abandoned.

BACKGROUND OF THE INVENTION

1. Field of the Invention

This invention relates to self-contained, mobile apparatus programed for movement in a preselected route to form work operations, and in an embodiment selected for illustration herein, to a lawnmower which is self-propelled and self-guided in a cutting pattern over a lawn.

2. Description of the Prior Art

Prior proposals relating to self-propelled mowers and similar devices have involved complex electronic steering mechanisms which require the attention of an operator while under propulsion. These known prior devices are not entirely automated for self-contained action, and involve substantial expense in original fabrication and subsequent maintenance.

SUMMARY OF THE INVENTION

The present invention provides a totally automated lawnmower or like device which, upon actuation, effectively moves over a preplanned route responsive to movement of an integrated information storage element which is, itself, actuated by movement of the mower.

It is a basic objective of this invention to provide mobile work apparatus having a changeable programed route and movable over said route to perform a work operation without the necessity for further control or supervision by an operator. A related advantage of importance resides in supplying a control means for apparatus as aforesaid which is mechanical in operation and is devoid of complex and costly electronic components.

Another objective is to provide a readily changeable programing system for mobile apparatus of this type, whereby the apparatus is adapted for use in different areas without substantial modification. This permits a single unit to be programed for employment at a number of different locations, in any order of use and thereby reducing the cost of operation on the basis of total area to be treated.

This invention comprehends the employment of its apparatus basically in lawn care, harvesting, and like operations, and to this end, provides a self-propelled cutter with a driven cutting element and drive wheel assembly, and a programed control tape, the tape mechanism being driven by the power source for the wheels and cutting element. This apparatus further includes a single steering wheel which is turned in its steering operation in response to the movement of the tape.

A further advantage of significance is to supply, in apparatus as aforesaid, means to return the mobile unit to a starting position upon completion of a cycle of operation.

Yet another objective resides in the provision of apparatus of the type described above which is relatively inexpensive to manufacture by comparison to electronic systems, and is durable in use and contains replaceable elements.

Other and further objects and advantages will become apparent to those skilled in the art from a consideration of the following specification when read in conjunction with the annexed drawings:

BRIEF DESCRIPTION OF THE DRAWINGS

FIG. 2 is an enlarged longitudinal cross-sectional view, partially broken away to show details, of the apparatus of FIG. 1;

FIG. 3 is a top plan view of the apparatus with its shroud removed for illustration of details;

DESCRIPTION OF THE PREFERRED EMBODIMENTS

Figure 1:
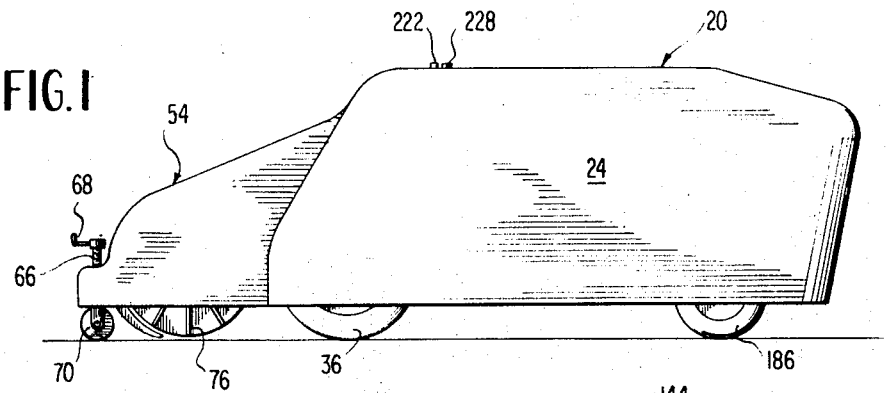
FIG. 1 is a side elevational view of a mobile work apparatus employing programed steering means in accordance with the teachings of the present invention.

Referring to the drawings in greater detail and initially to FIG. 1, shown therein and generally designated by reference numeral 20 is an embodiment of the invention in the form of a lawnmower. In FIGS. 2 and 3, the mower 20 will be seen to include a basic frame 22 with a shroudlike protective housing 24 substantially enclosing the operating components.

The frame 22 is formed of tubular metallic components and includes side elements 26, 28 and a connecting forward end section 30. The trailing ends of the side elements each have a bearing block 32 fixed thereto, and a drive axle 34 is journaled in the blocks. Main ground wheels 36 are carried on the axle and are rotatable therewith. The frame further includes a plurality of bridging crossmembers 38, each of substantially inverted U-form, and including horizontal top bars 40. A pair of upper support bars 42, 44, are fixedly mounted on said bar and serve a purpose appearing below in greater detail.

Secured on the side elements 26 and 28 at an intermediate location is a base plate 46 which serves as a mount for a rechargeable electric storage battery 48 with the customary leads 50, 52 extending therefrom.

For performing its work operation, the device 20 includes a rear mowing assembly 54. The assembly 54 comprises a pair of tubular side bars 56, 58 having enlarged bosses 60 at their inboard ends, the bosses having the drive axle 34 extended therethrough and being pivotally mounted thereon. The outboard ends of the side bars are joined by a transverse block 62 carrying a central, internally threaded sleeve 64. A screw shaft 66 is mounted in the sleeve 64 and has an upstanding crank handle 68 at its upper end and a ground wheel 70 at its lower end. A cutter bar 72 depends from the block and extends substantially the full width thereof. The height of cut of the mower is thus effectively controlled by the changeable height of the wheel 70 effected through selective rotation of the crank 68.

The mowing assembly 54 further comprises a cross-shaft 73 extended between the side bars intermediate their ends. A drum 74 is mounted on the shaft, the drum having a plurality of cutting blades 76 thereon. A pulley wheel 78 is also secured on the shaft 73.

Figure 7:
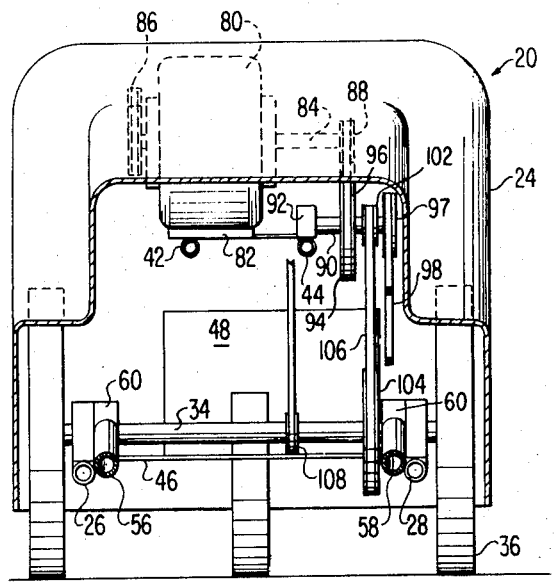
FIG. 7 is a sectional view taken from the section line 7—7 of FIG. 3, looking in the direction of the arrows.

Drive means for the mower comprises an electric motor 80 suitably secured on a plate 82 connected to the upper support bar 42 as shown in FIG. 7. The motor 80 is energized by the battery 48 through the leads 50 and 52, as appears hereinafter more fully, and has an output shaft 84 extending outwardly from its sides. One side of the shaft has a rewind control drive pulley wheel 86 thereon, and the other extended side has a mower and wheel drive pulley 88.

A stub shaft 90, best shown in FIG. 7, is mounted on a block 92 on the support 44 and carries a wheel 94 which is longitudinally aligned with the pulley 88. A belt 96 connects the latter pulley wheels to transmit rotary motion from the output shaft 84 of the motor to the stub shaft 90. The shaft 90 further carries a mower reel drive pulley 97 at its distal end which is aligned longitudinally with the pulley 78 of the mower. A belt 98 interconnects these pulleys in driving relationship—this relation being maintained by a spring-pressed tightener 100 depending from the support 44 in offset relation thereto as shown in FIG. 3.

A wheel drive pulley sprocket 102 is mounted on stub shaft 90 between the wheels 94 and 97 and is in working alignment with an enlarged pulley 104 on the axle 34. A drive belt 106 interconnects these pulleys. In FIG. 7, it will be observed that a further pulley wheel 108 is also mounted on the axle 34, performing a function dealt with below.

Figure 5:
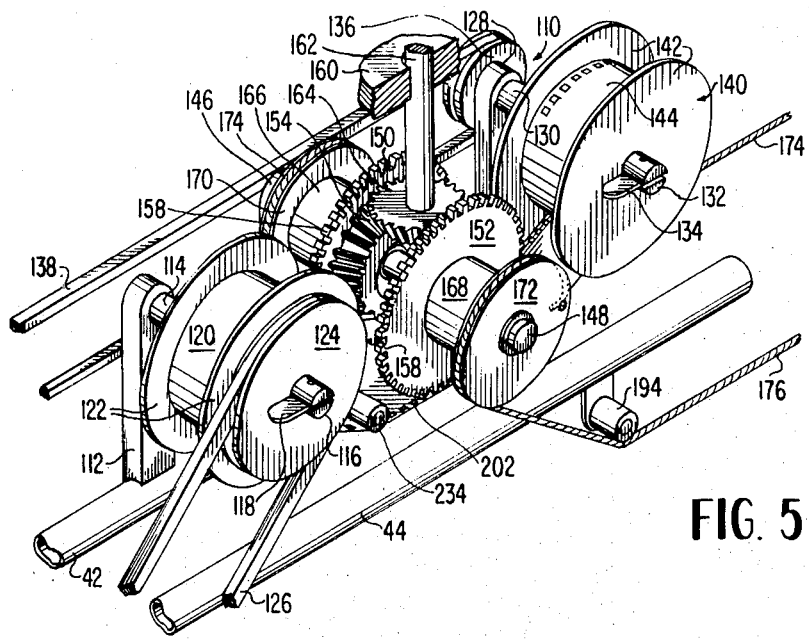
FIG. 5 is an enlarged perspective view showing the control assembly components hereof.

A basic and important component of the present invention comprises its new and novel drive control assembly 110 shown to best advantage in FIG. 5 of the drawing. As there seen, the assembly is mounted on the top supports 42 and 44. A standard 112 fixed in upstanding position on the support 42 has a fixed horizontal rod element 114 extending outwardly in the direction of the support 44, the rod being slotted at its distal end at 116 to receive a right angularly related, swingable locking key 118. A takeup reel 120 with side flanges 122 and a side pulley 124 fixed thereto is journaled on the rod. A belt 126 extends from the pulley 124 to the pulley wheel 108 on the main axle 34 whereby the takeup reel is rotated at a speed which is a function of the speed of the mower.

A second upright standard 128 is fixed to the support 42 adjacent the leading end of the mower, and has a rotatably mounted rod 130 extended outwardly from both its sides. The inboard end of the rod is slotted at 132 for a key 134, and the outboard side carries a rewind pulley wheel 136 aligned with the wheel 86 on the motor shaft 84—the latter two wheels being interconnected by a rewind, twist belt 138. A tape storage reel 140, with flanges 142, is freely mounted for rotation on the rod 130, and contains the program tape 144 described below.

Intermediate the first and second standards, a central standard 146 projects from the support 42. The standard 146 has an outer cylindrical shaft 148 on which a control gear system comprised of a first gearwheel 150 and a second gearwheel 152 are mounted. Each of said gearwheels has an inwardly facing bevel gear 154, 156, respectively, thereon, and each has projecting teeth 158 of a selected configuration and spacing. Depending from a block 160 fixed to the housing 24 is a vertical shaft 162 with a spur gear 164 meshed with the bevel gears in such manner as to impart opposing rotation to one wheel 150 or 152 upon rotation of the other.

Spacer sleeves 166, 168 are mounted on shaft 148 outwardly of the wheels, for rotation with the respective wheels, and cable control wheels 170 and 172 are secured to the sleeves for joint rotation therewith and with the respective gearwheels. Cables 174, 176 have their ends affixed to the respective wheels.

Figure 6:
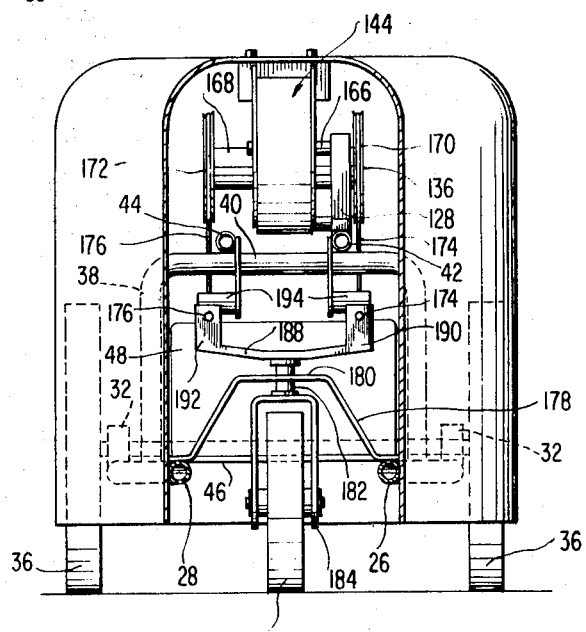
FIG. 6 is a sectional view showing details taken substantially on the section lines 6—6 of FIG. 3, looking in the direction of the arrows.

A forward steering means of the device comprises a yoke 178 (FIG. 6) interconnecting the frame sides 26 and 28 adjacent the leading end of the device. A central section 180 of the yoke has an opening therein receiving the upstanding pivot element 182 of a wheel mount 184 with a ground wheel 186 operatively secured thereto. A fork and steering handle 188 is secured to the element 182 and has wings 190, 192 to which the outer ends of the cables 174, 176, respectively, are secured, the cables being selectively guided by roller assemblies 194 depending from the upper supports.

The tape 144, preferably formed of a plastic material of heavy, long wearing construction, comprises a central body section 196 which preferably but not necessarily, is of a selected width less than the distance between the teeth 158 of the gearwheels 150 and 152, between which its side edges 198 and 200 pass during straight line operation of the mower. For accomplishing a turn of the mower, the tape, if narrower than the distance between the teeth 158, has laterally extended side portions 202 at selected intervals corresponding to the desired turning locations on the side 200, the portions 202 each having a series of gear teeth engaging, substantially rectangular, openings 204 formed therein. The openings 204 are of a spacing and configuration to correspond to the spacing of the teeth 158 of the gearwheel 152 and effectively cause the turning of the wheel when operatively engaged thereby, with a corresponding opposite rotation of the wheel 150 by virtue of its interengagement with the wheel 152 through the spur and bevel gear system.

For return of the device to an original or other selected course following a maneuver occasioned by the contact of the wheel 152 with the openings 204, an opposite extension 206 is supplied on the tape side 198, this extension having openings 208 spaced and formed to engage the teeth 158 of the gearwheel 150. As will occur to those skilled in the art, the spacing, duration and side of positioning of the extension will be determined by the desired maneuver to be accomplished, in an original programing of the tape selected in accordance with the requirements of the course as predetermined from a schematic layout such as that shown in FIG. 4. The position of the side extensions of the tape is to correspond following computation of the course to be taken and the speed of the mower, with the turning requirements of each individual course as selected.

Figure 10:
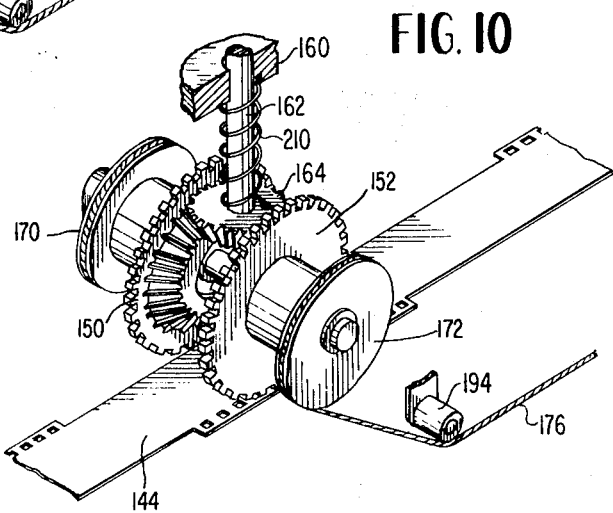
FIG. 10 is a view similar to FIG. 9 showing the modified form of the invention.
Figure 11:
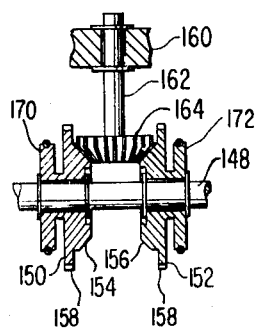
FIG. 11 is a sectional view on reduced scale of the preferred form of drive unit.

A modification of the return system is shown in FIG. 10. Here, a spring 210 is anchored to the spur gear 164 and to the block 160. Turning motion imparted to the shaft 162 by rotation thereof serves to store energy in the spring which, upon disengagement of the wheel from the openings in the tape, causes a return to the original path of travel by returning of the wheels.

Figure 8:
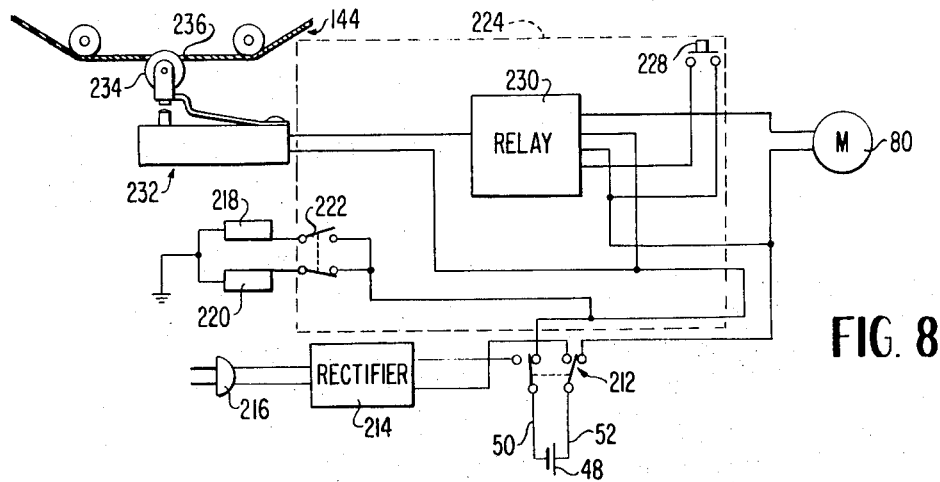
FIG. 8 is a diagrammatic electrical outline of a typical circuit adapted for use with the apparatus hereof.
Figure 9:
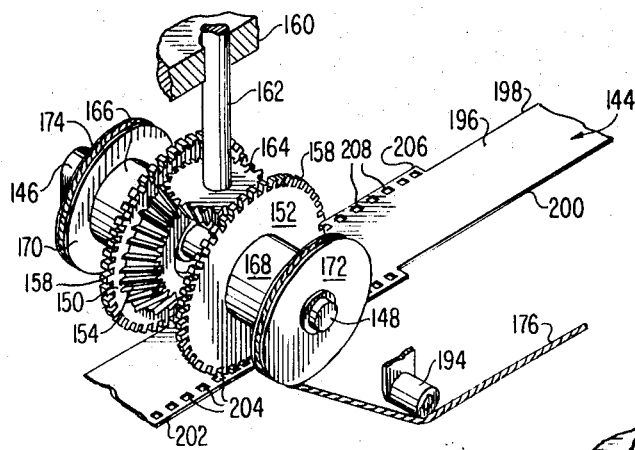
FIG. 9 is a further perspective view, partially broken away and in cross section, of a main gear assembly hereof.

Turning now to FIG. 8, which diagrammatically illustrates the power control system for the apparatus, the leads 50 and 52 are shown as being connected with a switch 212 for alternate connection of the battery circuit with the motor 80, or with a rectifier means 214 and a current source 216 for recharging the battery. The motor 80 has an electrically controlled rewind clutch 218 on the side adjacent the rewind pulley 86, and an electrically controlled drive engaging clutch 220 on the opposite side, said clutches being selectively energized by a switch 222. The leads 50, 52 extend to a control housing 224 mounted between a cross brace 226 and the mower housing 24, within which the switch 222 is mounted for actuation externally of this housing.

Also mounted in the housing 224 is an externally available starter switch 228 and a relay 230 to which the leads 50, 52 are connected in such a manner that the starter switch 228 energizes the relay 230 and motor 80, the relay then maintaining current supply to the motor. Current supply to the relay 230 is also controlled by a microswitch 232 which normally is maintained in closed position by a roller 234 bearing against the tape 144. At the end of the programed run, the tape is provided with a hole 236 into which the roller 234 may move to break the switch contacts and stop the motor.

Operation of the device is believed to be explained by the foregoing reference to the construction thereof. Upon suitable energization of the motor in its forward work position through engagement of the clutch 220, the wheels 36 and mowing assembly are actuated, also resulting in turning of the main axle 34. The pulley wheel 104 drives the takeup reel 120 with a consequent unreeling of the tape 144 from the supply reel 140. As the wheels 150 and 152 alternatively contact the extended portions 202 and 206 of the tape and are engaged by the openings 204 and 208, the wheels 170 and 172 are moved in opposing directions to thereby turn the steering handle 188 and the wheel 186, causing the mower to turn.

Figure 4:
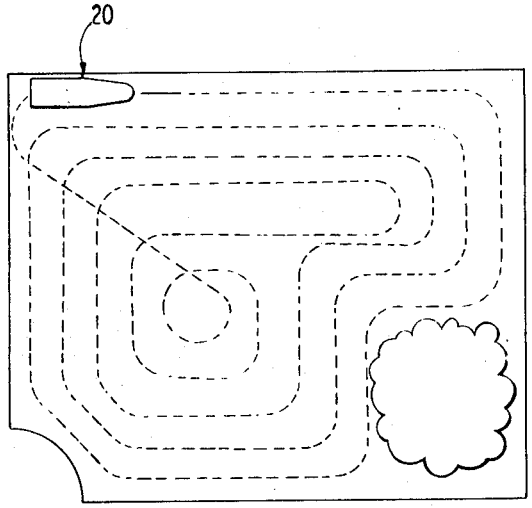
FIG. 4 is a diagrammatic view of a typical cutting pattern and route for the apparatus.

When the entire area to be covered has been mowed, and the tape exhausted, as diagrammatically illustrated in FIG. 4, the final maneuver programed on the tape is one of return to the original starting position. At such time as the tape is exhausted, the actuation of the microswitch 232 causes deactivation of the motor 80. The lever of switch 222 is then thrown and starter switch 228 closed to activate the clutch 218 and energize motor 80 to rewind the tape until a second hole 236 at the beginning of the tape causes the eventual shutdown of operation.

It will be clear that other and different tapes may be substituted by simply removing the supply reel 140 and substituting other reels with different tape programs thereon. It will likewise be readily observed that other and different drive systems and types of power source can be employed without departure from the substance of the invention.

I claim:

1. Apparatus for movement in a preplanned route over a given surface area, the apparatus comprising:
   an apparatus frame with surface engaging support means including a steering support;
   a steering assembly operatively engaged with the steering support;
   a work element operatively connected to the frame to perform a given operation on the surface area; and,
   means, including a programmed information storage member, directly mechanically connected with the steering assembly to turn the apparatus at preselected locations corresponding to the route.

2. The invention of claim 1, wherein the information storage member comprises a tape.

3. The invention of claim 1, including means for returning the apparatus to a starting location.

4. The invention of claim 1, wherein the apparatus comprises a mowing machine having a trailing cutting mechanism; and,
   the surface engaging support means comprise drive wheels.

5. Apparatus for movement in a preplanned route over a given surface area, the apparatus comprising:
   an apparatus frame with surface engaging support means including a steering support;
   a steering assembly operatively engaged with the steering support;
   a work element operatively connected to the frame to perform a given operation on the surface area; and,
   means, including a programmed information storage member, directly mechanically connected with the steering assembly to turn the apparatus at preselected locations corresponding to the route, said information storage member comprising a tape having a spaced series of control means;
   said steering assembly including a control system having means cooperative with and responsive to said series of control means to turn the apparatus.

6. The invention of claim 5, wherein said means cooperative with and responsive to said control means comprises a gearwheel system with at least one gearwheel engageable with said series of control means to turn the apparatus.

7. The invention of claim 6, wherein said control means comprise openings in said tape;
   the tape having laterally projecting side extensions with said openings formed therein; and,
   the gearwheel system including a gearwheel at each side of the tape.

8. The invention of claim 7, including means interconnecting the gearwheels at opposite sides of the tape, said means providing for equal movement of each opposing wheel in an opposite direction of rotation.

9. The invention of claim 8, wherein:
   the apparatus is electrically driven and includes a control circuit; and,
   a switch in said circuit arranged to stop the winding of the tape upon exhausting of the tape.

10. The invention of claim 9, wherein:
    the steering assembly comprises a cable connected for movement with each gearwheel;
    the cables being secured to a steering yoke; and,
    the steering yoke being connected to a wheel.

11. Programmed mowing apparatus for coverage of an area requiring straight movement and turning maneuvers of various angles, the apparatus comprising:
    a mower frame including frame side members, crossmembers bridging the side members, and a drive axle driving ground wheels on said drive axle;
    a single steering wheel mounted on a bracket adjacent the forward end of the frame for controlled pivotal movement, the wheel having a forked steering handle thereon with divergent wings;
    a cutting drum assembly, including mounting arms, and a rotatable reel, the arm being pivoted on the drive axle;
    motor means having an output shaft with a pulley connected thereto, including an electric motor and a rechargeable battery, mounted on the mower frame;
    a stub shaft drivingly connected to said output shaft, said stub shaft being mounted on the frame adjacent the motor and supporting a first pulley wheel and a drive belt extended to said drive axle for rotation of the axle and the driving ground wheels, and a second pulley mounted on said stub shaft and drivingly connected to said reel;
    a steering control system mounted on the frame and comprising a central shaft with two spaced-apart gearwheels thereon and two cable control wheels fixed thereto for movement responsive to gearwheel movement; a cable connecting the control wheels to the respective wings of the steering handle;
    the steering control system further comprising a forward shaft and a rear shaft, the forward shaft having a takeup spool and a drive pulley thereon, the drive pulley being connected by a drive belt to the pulley wheel on the motor output shaft; the rear shaft having a tape storage wheel thereon; and,
    a program tape dispensed by the storage reel and wound on the takeup spool, the program tape having a first side aligned with one of the gearwheels and a second side aligned with the other gearwheel, at least one side having a spaced series of control elements engaged by the respective gearwheel wheel and effective to rotate the cable control wheels and thereby turn the steering handle upon said engagement.

* * * * *